United States Patent

Shirakawa

[11] Patent Number: 5,825,371
[45] Date of Patent: Oct. 20, 1998

[54] GRAPHICS CONTROLLER INCLUDING A SUB-MEMORY

[75] Inventor: Haruyuki Shirakawa, Niigata, Japan

[73] Assignee: NEC Corporation, Tokyo, Japan

[21] Appl. No.: 635,597

[22] Filed: Apr. 22, 1996

[30] Foreign Application Priority Data

Apr. 20, 1995 [JP] Japan .................................. 7-094991

[51] Int. Cl.⁶ .............................. G06F 15/00; G06T 1/00
[52] U.S. Cl. ...................... 345/501; 345/114; 345/186; 345/153
[58] Field of Search .................................. 345/113, 114, 345/153–155, 199, 513, 514, 516, 150, 501, 186

[56] References Cited

U.S. PATENT DOCUMENTS

| | | | |
|---|---|---|---|
| 5,050,102 | 9/1991 | Sun et al. ............................... | 345/473 |
| 5,440,682 | 8/1995 | Deering ................................... | 345/516 |
| 5,526,025 | 6/1996 | Selwan et al. .......................... | 345/516 |
| 5,598,525 | 1/1997 | Nally et al. ............................ | 345/520 |
| 5,694,585 | 12/1997 | Dwin et al. ............................ | 395/521 |

*Primary Examiner*—Matthew M. Kim
*Assistant Examiner*—U. Chauhan
*Attorney, Agent, or Firm*—Foley & Lardner

[57] ABSTRACT

The content of a color designating register 3 that designates any color is compared with data preliminarily written to a main VRAM 4. The compared resultant data is stored in a sub-memory 2. In the case that display data is read, when data stored in the sub-memory 2 represents "match," color data stored in a palette 8 is then stored in a CRT-FIFO 5 through a switching portion 10, and the read operation to the main VRAM 4 for relevant pixel data is stopped. When data stored in the sub-memory 2 represents "miss-match," color data stored in the VRAM is then stored in a CRT-FIFO 5 through a switching portion 10.

15 Claims, 2 Drawing Sheets

GRAPHICS CONTROLLER INCLUDING A SUB-MEMORY

BACKGROUND OF THE INVENTION

1. Field of the Invention

The present invention relates to a personal computer, in particular, to a graphics controller for a display device used with a personal computer.

2. Description of the Related Art

In a graphics controller as a first related art reference, the operation of an external display device is normally asynchronous with the operation for reading a video signal as a display signal from a video random access memory (VRAM) that is a storing medium of the video signal. Since the external display device only holds a display's content for approximately several milliseconds, the graphics controller has to periodically read picture data from the VRAM and send the picture data to the display device. This operation is referred to as the "display refresh." A central processing unit (CPU) connected to the graphics controller has to conduct an access operation (reading/writing) to the VRAM. Therefore, the graphics controller has to conduct the display refresh to the VRAM and arbitrate the CPU's access. Conventionally, this arbitration is performed within a display period on a VRAM access from the CPU. In the first related art reference, because the graphics controller has a cache memory added, the CPU, or an instruction from a bus access to the graphics controller, during the display period, can access the cache memory of the graphics controller and speed up the process.

Thus, conventionally the write access of the display data to the VRAM is performed while data is being read from the VRAM during a non-display time (in other words, in blanking intervals of scanning lines). FIG. 2 is a block diagram showing a structure of the graphics controller according to the first related art reference. Referring to FIG. 2, so as to increase the controlling speed, the graphics controller according to the first related art reference comprises a cache memory 19, a cache controller 28, a main VRAM 20, a main VRAM controlling circuit 27, a cathode ray tube-first in first out (CRT-FIFO) register 21, and a conventional CPU (not shown). While a conventional graphics controller is executing the read cycle, the write cycle for writing picture data of an external device to the main VRAM is temporarily stopped.

On the other hand, in the first related art reference, even while the display read cycle to the VRAM is being executed, picture data is stored in the cache memory 19. Thus, the waiting time of the CPU to the VRAM and the external display device to the VRAM is decreased and thereby the performance is improved. In FIG. 2, in order to update the picture data to be displayed, the main VRAM 20 is accessed by the CPU. In addition, since the display device (such as a CRT) only holds picture data to be displayed for several milliseconds, the graphics controller accesses the main VRAM 20 to output the same picture data to be displayed several 10 times per second. This operation is the display refresh. The cache controller 28 writes and reads picture data to and from the cache memory 19. In addition, the cache controller 28 controls the timings of the write and read operations for the data to be written and read to and from the cache memory 19. The main VRAM controlling circuit 27 controls picture data received from the cache memory 19, that is controlled by the cache controller 28, and picture data received from the external device and then supplies the resultant picture data to the main VRAM 20. In FIG. 2, reference numeral 22 is a data bus used to write data to the cache memory 19. Reference numeral 23 is a signal bus for sending control signals (address, WE, OE, and so forth) to the cache memory 19. Reference numeral 24 is a data bus for reading data from the cache memory 19. Reference numeral 25 is a bus for sending addresses, control signals, and write data to the main VRAM 20. Reference numeral 26 is a bus for reading data from the main VRAM 20.

FIG. 3 is a block diagram showing a structure of a graphics controller according to a second related art reference. In the second related art reference, an external cache memory is not used. Referring to FIG. 3, a CRT-FIFO 30 is disposed on the output terminal side where picture data to be displayed is supplied from a main VRAM 20 to a display. In this structure, picture data is fully stored in the CRT-FIFO 30 for a predetermined time period so as to perform the display refresh. The time period used for the CRT-FIFO 30 to empty, or to store picture data to be displayed, is designated as the write enable time of the external device. By designating the ratio between the CPU access operation and the display refresh operation, the write performance of the external device can be adjusted.

In the first related art reference, data written from the external device to the cache memory is read by the graphics controller. Thereafter, the resultant data is sent to the main VRAM. In addition, the graphics controller automatically initiates a data block transmission. Thus, complicated control operations are required. Moreover, the performance of the graphics controller, according to the first related art reference, largely depends on the storage capacity of the cache memory. Thus, when a cache memory with a large storage capacity is used, the speed of the operations of the graphics controller can be increased. However, data stored in the cache memory is only luminance data and color difference data, or red, green, blue (RGB) data. And, when 256 colors are displayed, a storage capacity of one byte per pixel is required. Consequently, the storage capacity of the cache memory becomes eight times higher than that of the number of pixels temporarily stored. When a high resolution is required, the storage capacity of the cache memory is disadvantageously increased. However, with a limited storage capacity of the cache memory, the performance of the cache controller is inversely proportional to the resolution.

In the second related art reference, since the performance can be designated with any ratio between read time of picture data by the CPU and the display refresh time, an optimum condition can be accomplished with any resolution. However, when the access time of the external device is larger than the read access time for storing picture data to the CRT-FIFO 30, the read operation for the display refresh cannot be satisfactorily performed. Thus, picture data may flicker. Consequently, the display quality is significantly deteriorated. In other words, a threshold value as to the maximum value of the CPU access time that prevents picture data from flickering is inevitably limited. In addition, this ratio should be obtained corresponding to the number of bytes per pixel, the dot clock frequency, and so forth on a trial and error basis.

SUMMARY OF THE INVENTION

A first aspect of the present invention is a graphics controller for converting data stored in a memory into data with a format corresponding to a display device, and then providing the resultant data as picture data to be displayed, comprising a color designating register for designating any color information, a sub-memory having a storage capacity corresponding to a resolution with which the picture data can be displayed, a sequencer for controlling the access of a main VRAM, and a display controlling portion for converting the read data from the sub-memory and the main VRAM according to a remainder address in the sub-memory into data with a format corresponding to the display device and providing an output of the resultant data to the display device at a designated time.

A second aspect of the present invention is a graphics controller for converting data stored in a memory into data with a format corresponding to a display device and providing the resultant data as picture data to be displayed, comprising a color designating register for designating any color information, a controlling circuit for controlling a sub-memory with a storage capacity corresponding to a resolution with which the picture data can be displayed, a memory interface for sending data to the submemory, a sequencer for controlling the access to a main VRAM, and a display controlling portion for converting the read data into data with a format corresponding to the display device and providing an output of the converted data to the display device at a designated time.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
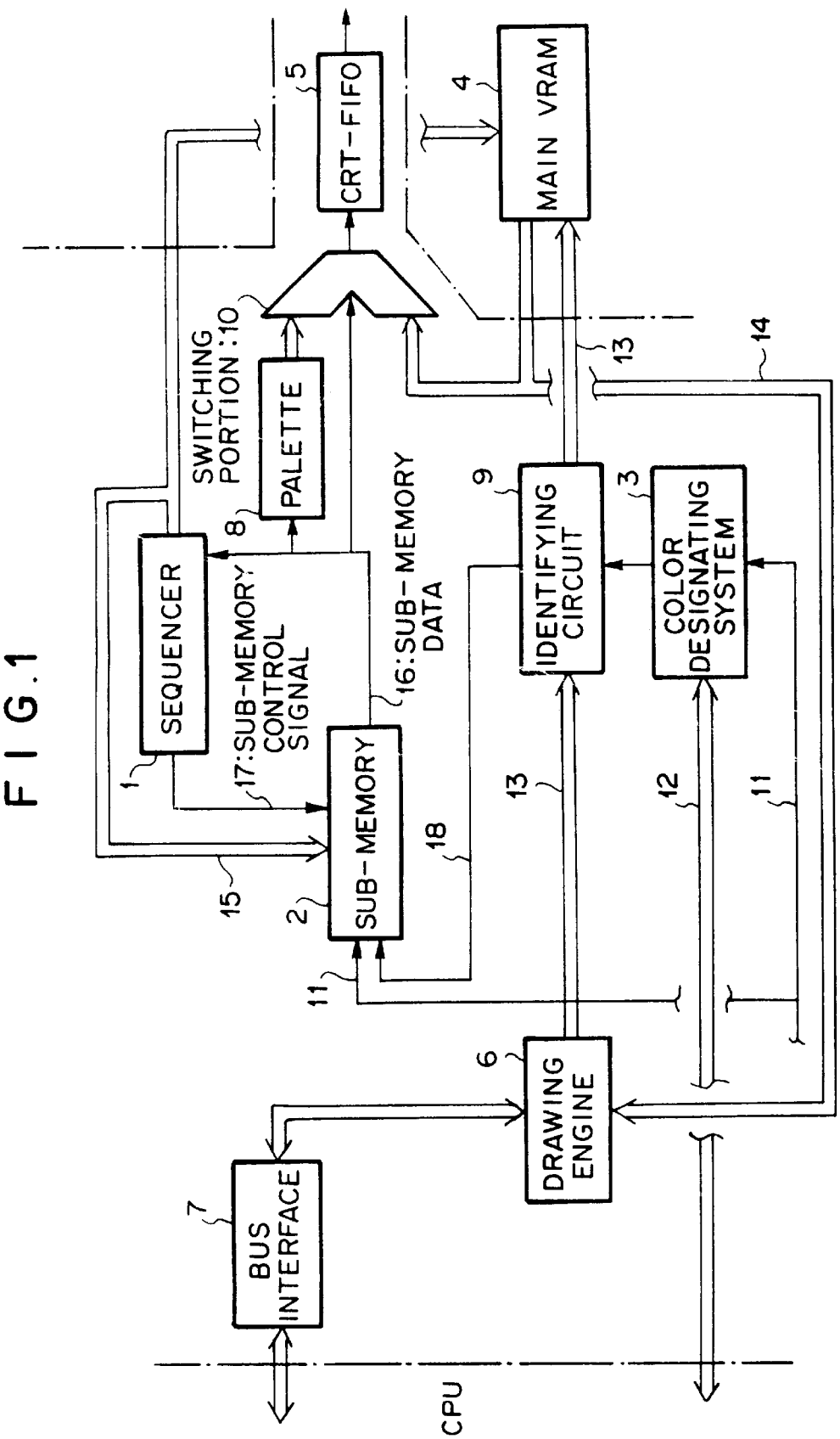
FIG. 1 is a block diagram showing a structure of a graphics controller according to an embodiment of the present invention.
Figure 2:
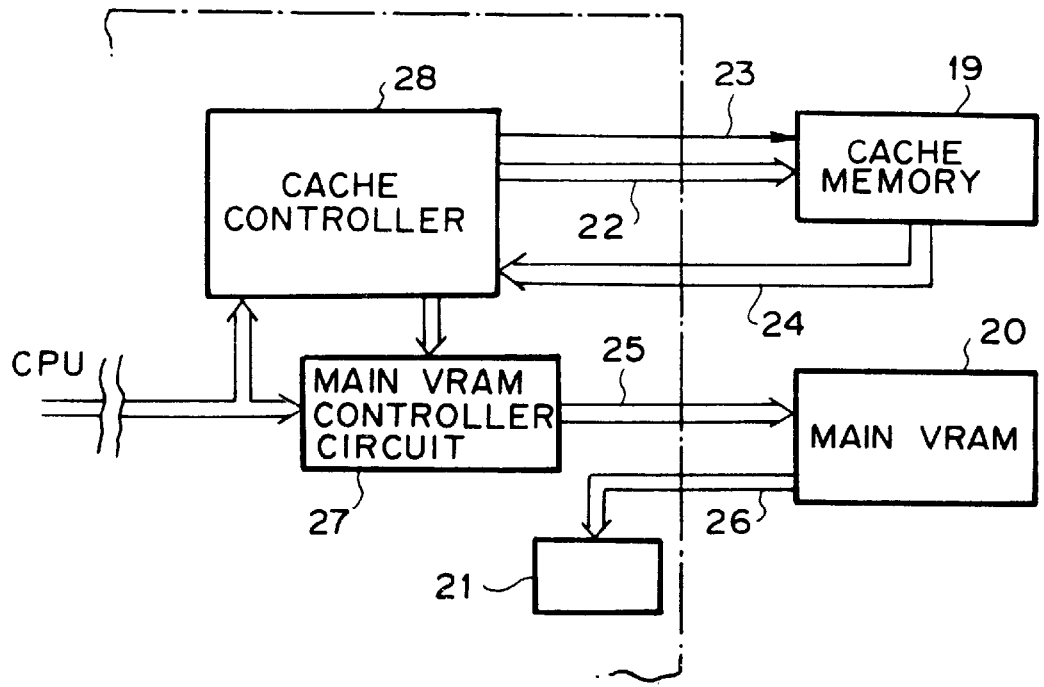
FIG. 2 is a block diagram showing a structure of a graphic controller according to a first related art reference.
Figure 3:
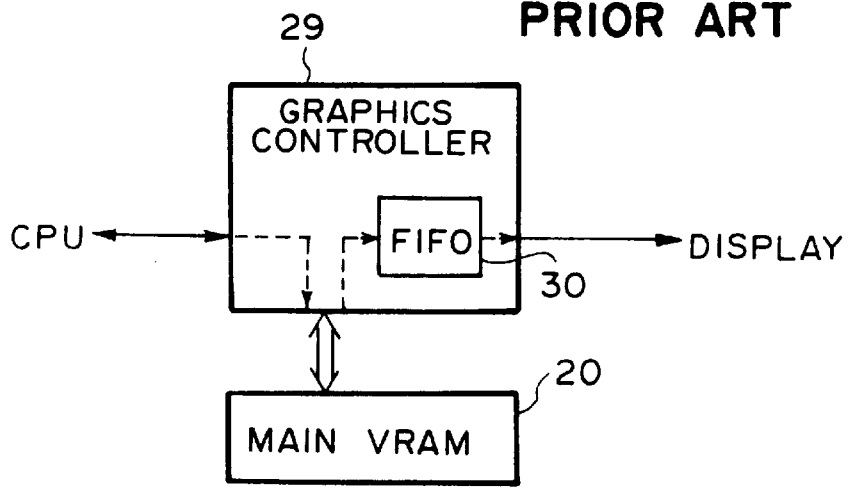
FIG. 3 is a block diagram showing a structure of a graphic controller according to a second related art reference.

FIG. 1 is a block diagram showing a structure of a graphics controller according to an embodiment of the present invention. This graphics controller cannot be used for a character code type controlling method that is used for displaying text data because pixels do not accord with data stored in a memory in a 1 to 1 relation.

In FIG. 1, the graphics controller comprises a color designating register 3 that designates any color information (i.e. color data), a controlling circuit (i.e. identifying circuit) 9 that controls a sub-memory 2 having a storage capacity corresponding to a resolution with which the picture data can be displayed. The identifying circuit 9 sends to the sub-memory 2 the resulting data from comparing picture data from a drawing engine 6 with the color information of the designating register 3. There is further provided a memory interface 40 that sends the data to the sub-memory 2, a sequencer 1 that controls the access to the main VRAM (video random access memory) 4 and the sub-memory 2, a palette 8 (i.e., display controlling portion) that converts the read data of the sub-memory 2 into data with a format corresponding to the display device, a display switching portion 10 that switches and outputs the converted data from the palette 8 or picture data of the main VRAM 4 to the display device at a designated timing, a CRT-FIFO 5 that temporarily stores a picture data output of the switching portion 10 to a FIFO memory (e.g., a display circuit) and outputs the picture data output to a external display device, and the drawing engine 6 that receives picture data from a BUS interface 7 or receives picture data from the main VRAM 4, and compensates the picture data for every pixel, and transfers the resultant picture data to the identifying circuit 9.

First, any (e.g., the most used) color can be designated by either the user or on the basis of user-experience (e.g., using a color input device to designate the color). The designated color data is stored in the color designating register 3. Although any color can be designated, it is typical that a background color is generally selected as the color that is most used. At this point, all data stored in the sub-memory 2 is cleared (=0). The sub-memory 2 is composed of a dual-port memory. The addresses of picture data to be displayed are automatically updated corresponding to a shift clock control signal 17 that is input to the sub-memory 2. In the sub-memory 2, picture data is stored in such a manner that each pixel accords with one bit. When data stored in the main VRAM 4 accords with data stored in the color designating register 3, a "1" in the sub-memory is designated. Otherwise, when data stored in the main VRAM 4 does not accord with data stored in the color designating register 3, an "O" in the sub-memory 2 is designated. Output data 16 is data of one bit per pixel.

The output data 16 of the sub-memory 2 is sent to the sequencer 1, the palette 8, and the switching portion 10.

When the picture data to be displayed is written to the main VRAM 4, the value of the color designating register 3 is compared with picture data sent from a drawing engine 6 by the identifying circuit 9 connected to the data bus 13 between the drawing engine 6 and the identifying circuit 9. In this embodiment, "1" represents a match of the compared data, whereas "O" represents a mismatch (i.e., not matched) of the compared data. In this case, data of a display color that will be most used has been written to the color designating register 3. Thus, when a mismatch occurs, picture data is written into the VRAM 4. The resulting data is written into the sub-memory 2. That is, when the data is "1", the sub-memory 2 stores the data "1" according to the address, and when the data is "O", the main VRAM stores the picture data according to the address. In practice, the entire display region is rewritten by a task switching operation. Thus, when the write access operation is performed for the main VRAM 4, the compared results are stored in the sub-memory 2 so as to simplify the control operations. During the control operation for rewriting the entire display region, the same effect can be obtained. An output trigger signal of the palette 8 is activated with the binary data received from the sub-memory 2. For example, the palette 8 transforms the binary data to the data of the color designating system 3. The color designated by the palette 8 is stored in the CRT-FIFO 5 through the switching portion 10. Corresponding to the binary data stored in the sub-memory 2, a selection signal to the switching portion 10 varies, thereby switching the source of the picture data to be displayed. The switching portion 10 is disposed on the input terminal side of the CRT-FIFO 5. In this embodiment, when "1", representing a match, is received from the sub-memory 2, the switching portion 10 switches the source of the display data to the palette 8. In contrast, when "O" is received from the sub-memory 2, the switching portion 10 switches the source of the display data to the main VRAM 4.

In this embodiment, the color designating register 3 and the palette 8 are redundantly disposed. This is because the output of the color designating register 3 can be changed at any time by the CPU. In addition, when the content of the color designating register 3 is copied to the palette 8 in blanking intervals, the flickering of the picture data to be displayed can be suppressed. Moreover, when the contents of the color designating register 3 and the palette 8 are independently designated, the background color can be changed.

Next, the operation of the sequencer 1 will be described. The data 16 that is read from the sub-memory 2 is also supplied to the sequencer 1. When the input data 16 is "O", the read cycle for the main VRAM 4 is activated. Thus, data is sent from the main VRAM 4 to the CRT-FIFO 5.

The write operation to the main VRAM 4 is performed by a drawing engine 6 disposed in the graphics controller. Further, the main VRAM stores all picture data that is controlled by a co-processor of the drawing engine 6. However, when data is written to the main VRAM 4, there is a case when the CPU only designates a part of the parameters of a figure (such as the start and end points of a straight line). A co-processor of the drawing engine 6 generates drawing data for each missing pixel corresponding to the parameters of the figure and the drawing engine 6 outputs all the parameters of the picture pixels having supplemented the missing pixels. However, since an identifying circuit 9 is disposed on the data input/output side of the main VRAM 4 through the bus 13, the write data is compared with the data stored in the color designating register 3 by the identifying circuit 9. The compared result data 18 is stored in a storage position of the sub-memory 2 corresponding to a memory address bus 15 generated by sequencer 1. Now, it is assumed that only the parameters for the start and end points of a straight line are designated and input to the drawing engine 6 from the CPU bus through the bus interface 7. The drawing engine 6 generates the addresses of the pixels between the start and end points of the straight line and calculates the storage addresses of the sub-memory 2.

In addition, the drawing engine 6 generates color data for the pixels. The content of the color designating register 3 can be changed at any time. However, when the content of the color designating register 3 is changed, the content of the sub-memory 2 is cleared with a write trigger signal 11. Thus, all data that is output from the sub-memory 2 becomes "O" (namely a mismatch). Consequently, the content of the palette 8 is ignored. Thus, all picture data to be displayed is read from the main VRAM 4 until the compared result data 18 is found to be the data "1" that is stored in the sub-memory 2. Therefore, according to the data "1" and the address of the sub-memory 2, the picture data to be displayed is changed to the data of the color designating register (e.g., circuit) 3.

As described above, according to a preferred embodiment of the present invention, the display color that is most used in the display device is stored in the color designating register 3. When the ratio of "match" information to the "not-matched" (i.e., mismatched) information stored in the sub-memory 2 is large, the pixel data can be largely output to the display device without the need to access the main VRAM 4. In particular, when colors that are used as the background for a graphics application in a GUI (graphical user interface) are displayed, because the read operation for the main VRAM 4 is not required as long as the picture data stored in the main VRAM 4 accords with the data stored in the color designating register 3, the saved CPU time can be used for the access operation of another device for the main VRAM 4. For example, the picture data to be displayed can be output without the need to read the main VRAM 4. Thus, when the same colors as the background colors are used, the access performance by the external device is improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention which is indicated by the following claims.

What is claimed is:

1. A graphics controller for displaying data stored in video memory as picture data to be displayed, comprising:

a color designating register for designating color information from which a color designation is supplied to an identifying circuit;

a sub-memory, coupled to said identifying circuit, having a storage capacity corresponding to a resolution with which the picture data can be displayed;

a main VRAM, coupled to said identifying circuit;

said identifying circuit having a first input coupled to said color designating register and a second input coupled to at least one of said VRAM and an external input device, said identifying circuit providing an output to said sub-memory dependent upon the results of each comparison between said first and second inputs;

a sequencer for controlling an access of the main VRAM and said sub-memory;

a display controlling portion, coupled to said sub-memory, for converting the read data from said sub-memory into data with a format corresponding to the display device; and a display switching portion having a first input coupled to receive an output of said VRAM, and a second input coupled to receive an output of said display controlling portion, said switching portion outputting one of said first and second inputs based on the output of said sub-memory; and wherein at least one color that comprises the picture data is stored in said color designating register.

2. The graphics controller as set forth in claim 1, wherein said sub-memory further comprises a one-bit memory for each pixel that represents a match or a miss-match of the picture data and the data stored in said color designating register.

3. The graphics controller as set forth in claim 1, further comprising:

a CRT-FIFO for temporarily storing picture data of said display controlling portion.

4. The graphics controller as set forth in claim 1, wherein said external input device comprises:

a drawing engine for generating picture data for a plurality of pixels using a scan interpolation.

5. The graphics controller as set forth in claim 1, wherein a color that is stored in said color designating register is the most used color in the picture data.

6. The graphics controller as set forth in claim 1, further comprising a drawing engine for generating picture data for a plurality of pixels, the drawing engine connected to at least one of the identifying circuit and the main VRAM.

7. The graphics controller as set forth in claim 1, wherein the display controlling portion is a palette.

8. A graphics controller for displaying data stored in a video memory as picture data to be displayed, comprising:

a color designating register for designating color information from which a color designation is supplied to a controlling circuit, the color designating register connected to the controlling circuit;

said controlling circuit for controlling a sub-memory with a storage capacity corresponding to a resolution with which the picture data can be displayed, the controlling circuit connected to the sub-memory;

a main VRAM, connected to the controlling circuit, for storing the picture data;

a sequencer for controlling the access to the main VRAM, the sequencer connected to the main VRAM;

a display controlling portion for converting the read data from said sub-memory into data with a format corresponding to the display device and a display switching portion for outputting the converted data to the display device at a designated timing, the display controlling portion connected between the sub-memory and the display switching portion, the display switching portion connected to the main VRAM; and wherein said sub-memory is a one-bit per pixel memory that represents a match or a miss-match of the picture data and the data stored in said color designating register.

9. The graphics controller as set forth in claim 8, wherein a color that is most used in the picture data is stored in said color designating register.

10. The graphics controller as set forth in claim 8, further comprising:

a CRT-FIFO for temporarily storing picture data of said display controlling portion.

11. The graphics controller as set forth in claim 8, further comprising:

a drawing engine for generating picture data for a plurality of pixels by performing a scan interpolation of a plurality of available display device parameters, connected to at least one of the controlling circuit and the main VRAM.

12. The graphics controller as set forth in claim 8 wherein at least one color that comprises the picture data is stored in said color designating register.

13. The graphics controller as set forth in claim 12 wherein a color that is stored in said color designating register is the most used color in the picture data.

14. The graphics controller as set forth in claim 8, wherein said sequencer controls the access of the main VRAM and the sub-memory, the sequencer connected to the sub-memory.

15. A graphics controller for supplying color data to an output display device comprising:

a color designating register for storing a first color data, an identifying circuit, connected to the color designating register, for receiving the first color data, a VRAM, connected to the identifying circuit, for receiving and storing a second color data that is different from the first color data, a color input device, connected to the VRAM and to the identifying circuit, providing a plurality of pixel color data, a sub-memory connected to the identifying circuit, the sub-memory having a storage capacity corresponding to a resolution of the output display device, the sub-memory storing one bit per pixel of the output display device, each bit having a first state when a pixel color data matches the first color data, and a second state when the pixel color data does not match the first color data, wherein the identifying circuit performs a comparison operation, comparing each of the pixel color data supplied by the color input device to the first color data from the color designating register, and for each comparison, the identifying circuit generates the first bit state when the pixel color data matches the first color data, and generates the second bit state when the pixel color data does not match the first color data, and feeds the first and second bit states to the sub-memory for storage, and the identifying circuit feeds the pixel color data to the VRAM when the pixel color data does not match the first color data, a palette, connected to the sub-memory, for receiving the bits and for storing the first color data from the color designating register, wherein, upon receipt of each bit in the first state from the sub-memory, the palette outputs the first color data in a format usable by the output display device, a display circuit that serves the output display device, a switching device connected to the display circuit, the VRAM, the palette, and the sub-memory, wherein, for each bit in the first state fed from the sub-memory to the palette and to the switching device, the switching device connects the palette to the display circuit for providing the first color data to the display device, and wherein, for each bit in the second state fed from the sub-memory, the switching device connects the VRAM to the display circuit for providing the pixel color data to the display circuit.

* * * * *